United States Patent
Jedneak

(10) Patent No.: US 9,067,231 B2
(45) Date of Patent: Jun. 30, 2015

(54) SYNCHRONIZATION OF RETRIEVAL SYSTEM AND OSCILLATOR FOR SLED-BASED APPLICATION OF A COATING MATERIAL

(71) Applicant: INLAND PIPE REHABILITATION, L.L.C., The Woodlands, TX (US)

(72) Inventor: Allan Ray Jedneak, Andover, MN (US)

(73) Assignee: INLAND PIPE REHABILITATION LLC, The Woodlands, TX (US)

( * ) Notice: Subject to any disclaimer, the term of this patent is extended or adjusted under 35 U.S.C. 154(b) by 407 days.

(21) Appl. No.: 13/737,478

(22) Filed: Jan. 9, 2013

(65) Prior Publication Data

US 2013/0280424 A1 Oct. 24, 2013

Related U.S. Application Data

(60) Provisional application No. 61/636,386, filed on Apr. 20, 2012.

(51) Int. Cl.
*B05C 7/08* (2006.01)
*B05D 7/22* (2006.01)
(Continued)

(52) U.S. Cl.
CPC . *B05C 7/08* (2013.01); *B05D 7/222* (2013.01); *B05D 7/225* (2013.01); *B05B 13/0636* (2013.01);
(Continued)

(58) Field of Classification Search
CPC ............. B05C 7/08; B05C 7/02; F16L 55/18; F16L 55/1645; F16L 55/30; B05B 13/0627; B05B 13/0636; B05B 1/00; B05D 7/222; B05D 7/225; B08B 9/0433; B08B 9/045; B08B 9/047; B23K 37/0276; B23K 37/0211; B29C 63/26; B29C 63/38; B29C 2063/483; B29C 2063/485; Y10S 118/10
USPC .................. 118/306, 317, 323, DIG. 10, 696; 427/236, 240, 427.1, 427.2, 427.3; 134/22.11, 22.12, 24, 169 R, 179–181; 451/76; 239/750, 264, 265; 138/97, 98
See application file for complete search history.

(56) References Cited

U.S. PATENT DOCUMENTS 2,305,239 A * 12/1942 Crom .......................... 405/150.2
2,461,517 A 2/1949 Carnevale
(Continued)

FOREIGN PATENT DOCUMENTS

DE 19823398 A1 12/1999
EP 1351009 A1 10/2003
(Continued)

OTHER PUBLICATIONS

International Search Report of International PCT Application No. PCT/US2013/030195, dated Apr. 20, 2012.
(Continued)

*Primary Examiner* — Laura Edwards
(74) *Attorney, Agent, or Firm* — Marshall, Gerstein & Borun LLP

(57) ABSTRACT

A planetary gear retrieval system for pulling a sled at a constant velocity along an interior of a pipe, and a sled for applying a coating material to the interior of the large-diameter pipe. The planetary gear retrieval system is connected to the sled via a chain, and has a network of gears controlled by a first variable speed microcontroller. A spinner on a linear oscillating plate provided on the sled is controlled by a second variable speed microcontroller. The first and second microcontrollers are programmable to be synchronized with one another so as to pull the sled at a desired constant rate and achieve a desired number of passes of the spinner along a given length of pipe while the sled is pulled at the desired rate.

8 Claims, 6 Drawing Sheets

(51) Int. Cl.
  *F16L 55/1645* (2006.01)
  *F16L 55/18* (2006.01)
  *F16L 55/30* (2006.01)
  *B05B 13/06* (2006.01)
  *B05C 7/02* (2006.01)
  *B05B 1/00* (2006.01)

(52) U.S. Cl.
  CPC ... *B05C 7/02* (2013.01); *B05B 1/00* (2013.01); *Y10S 118/10* (2013.01); *B05B 13/0627* (2013.01); *F16L 55/1645* (2013.01); *F16L 55/18* (2013.01); *F16L 55/30* (2013.01)

(56) References Cited

U.S. PATENT DOCUMENTS

| | | | | |
|---|---|---|---|---|
| 2,957,448 | A | * | 10/1960 | Dynia ............... 118/705 |
| 3,012,757 | A | | 12/1961 | Marzolf |
| 3,022,765 | A | | 2/1962 | Xenis |
| 3,525,111 | A | | 8/1970 | Arx |
| 3,606,862 | A | | 9/1971 | Huff et al. |
| 4,023,502 | A | | 5/1977 | Elsing |
| 4,120,260 | A | * | 10/1978 | Kubo et al. ........... 118/317 |
| 4,148,465 | A | | 4/1979 | Bowman |
| 4,178,875 | A | * | 12/1979 | Moschetti ........... 118/712 |
| 4,252,763 | A | | 2/1981 | Padgett |
| 4,493,593 | A | | 1/1985 | Schlimbach |
| 5,409,561 | A | | 4/1995 | Wood |
| 6,209,852 | B1 | | 4/2001 | George et al. |
| 6,227,813 | B1 | | 5/2001 | Leimer |
| 6,408,785 | B1 | * | 6/2002 | Hoogen et al. ........... 118/33 |
| 6,427,726 | B1 | | 8/2002 | Kiest, Jr. |
| 6,626,195 | B1 | * | 9/2003 | Garman et al. ........... 134/104.1 |
| 6,632,475 | B1 | | 10/2003 | Bleggi |
| 6,699,324 | B1 | | 3/2004 | Berdin et al. |
| 6,986,813 | B2 | | 1/2006 | Davis |
| 7,275,733 | B2 | | 10/2007 | Svitavsky et al. |
| 7,591,901 | B1 | * | 9/2009 | Weisenberg ........... 118/306 |
| 7,866,277 | B1 | | 1/2011 | Weisenberg |
| 8,079,569 | B2 | | 12/2011 | Lesko |

FOREIGN PATENT DOCUMENTS

| | | |
|---|---|---|
| EP | 2258974 A2 | 12/2010 |
| EP | 2258974 A3 | 5/2013 |
| WO | WO-2004112972 A1 | 12/2004 |

OTHER PUBLICATIONS

Written Opinion of International PCT Application No. PCT/US2013/030195, dated Apr. 20, 2012.

* cited by examiner

SYNCHRONIZATION OF RETRIEVAL SYSTEM AND OSCILLATOR FOR SLED-BASED APPLICATION OF A COATING MATERIAL

CROSS-REFERENCE TO RELATED APPLICATION

The present application claims the benefit of the filing date of U.S. Provisional Application No. 61/636,386, filed Apr. 20, 2012. The entire text of Provisional Application No. 61/636,386 is incorporated herein by reference.

FIELD OF THE DISCLOSURE

This disclosure relates generally to reinforcement of pipes by applying a continuous thickness of a coating material to the interior thereof and, more specifically, to a method and system to ensure synchronization of constant-velocity advancement of a sled carrying a spinner that sprays the continuous material, the mechanism including a planetary gear that drives a retrieval chain attached to the sled, with oscillation of a linear oscillating plate on which the spinner is mounted.

BACKGROUND OF THE DISCLOSURE

When applying a coating material, for example, a cementitious mortar material, to an interior wall of a pipe for the purpose of reinforcement of the pipe so as to prolong its service life, it is desirable to apply a constant thickness of the coating material over a given length of the pipe. A spinner mounted to a sled that can be moved along the interior of the pipe to be reinforced provides an effective vehicle for spraying coating material to the interior of the pipe. In order to actuate the sled, a chain may be secured to a leading end of the sled, and retrieval system may be provided to pull the chain, and thereby pull the sled, along the interior of the pipe. While the retrieval system could be in the form of a spool, it is recognized that during movement of the sled, as more and more of the chain is collected by the retrieval system and wound about the spool, assuming a constant angular velocity of the spool, the effective rate of movement of the sled decreases. As a result, unless the rate of spray of the coating material is adjusted, the thickness of coating material unacceptably increases as the sled approaches the spool.

SUMMARY OF THE DISCLOSURE

The present disclosure provides a retrieval system having a planetary gear so as to present a chain drive system that pulls a sled, to which a spinner is mounted, at a constant velocity along the interior of a given length of a pipe, without the need to adjust the gear motor of the retrieval system, or the rate of spray of the spinner, during application of a coating material to the interior of the pipe. By employing a variable speed microcontroller to control the power of the gear motor that drives a first gear in a network of gears of the planetary gear retrieval system, an operator can obtain precision with regard to the rate of advancement of the sled along the pipe.

The spinner may be mounted on a linear oscillating plate, which moves back and forth axially as the sled is pulled along the length of the pipe. This achieves a desirable layering of the coating material as it is sprayed onto the interior of the pipe. By providing a second variable speed microcontroller in operable communication with the linear oscillating plate on which the spinner is mounted, the operator can obtain precision with regard to the rate of oscillation of the plate, thereby carefully controlling the layering of coating material being deposited onto the interior of the pipe during operation.

Depending on such variables as the consistency of the coating material, the diameter of the pipe, and the condition of a given length of pipe to which coating material is to be applied, the operator will determine, prior to initiation of operation, a desired thickness of the coating material to be applied to the pipe. By synchronization of the variable speed microcontroller of the planetary gear retrieval system with the variable speed microcontroller of the linear oscillating plate, an operator may set the planetary gear retrieval system and the oscillating plate to operate at speeds that will apply a specific desired thickness of the coating material along the given length of pipe.

DETAILED DESCRIPTION OF THE DISCLOSURE

Disclosed herein is a method and system to ensure synchronization of constant-velocity advancement of a sled carrying a spinner that sprays the coating material, the mechanism including a planetary gear that drives a retrieval chain attached to the sled, with oscillation of a linear oscillating plate on which the spinner is mounted. Pipes and other openings such as tunnels and culverts can be coated for a variety of purposes with a variety of materials. For example, pipes can be coated with a cementitious mortar to reinforce the structure of the pipes. In many applications, it is desirable to ensure a coating having a uniform thickness. As used herein, the term "pipe" generally refers to any conduit, including, for example, pipes, culverts, tunnels, and ducts. The pipe can have a diameter, for example, of 24 inches or greater. For example, in some embodiments, a pipe can have a large-diameter, for example, greater than or equal to 102 inches or greater than or equal to 170 inches. The pipe can have any suitable cross-sectional shape. For example, the pipe can have a circular, square, ellipsoidal, half-circular, or rectangular cross-sectional shape. The pipe can be formed of any suitable material. For example, the pipe can be formed of cast iron, reinforced concrete, steel, brick, and/or stone. For example, in one embodiment, the pipe is a tunnel formed of sandstone. The pipe can have solid or corrugated walls.

The coating material can be any desirable coating material. For example, the coating material can include, but not limited to, a cementitious mortar, an epoxy, a paint, and/or tar.

Figure 1:
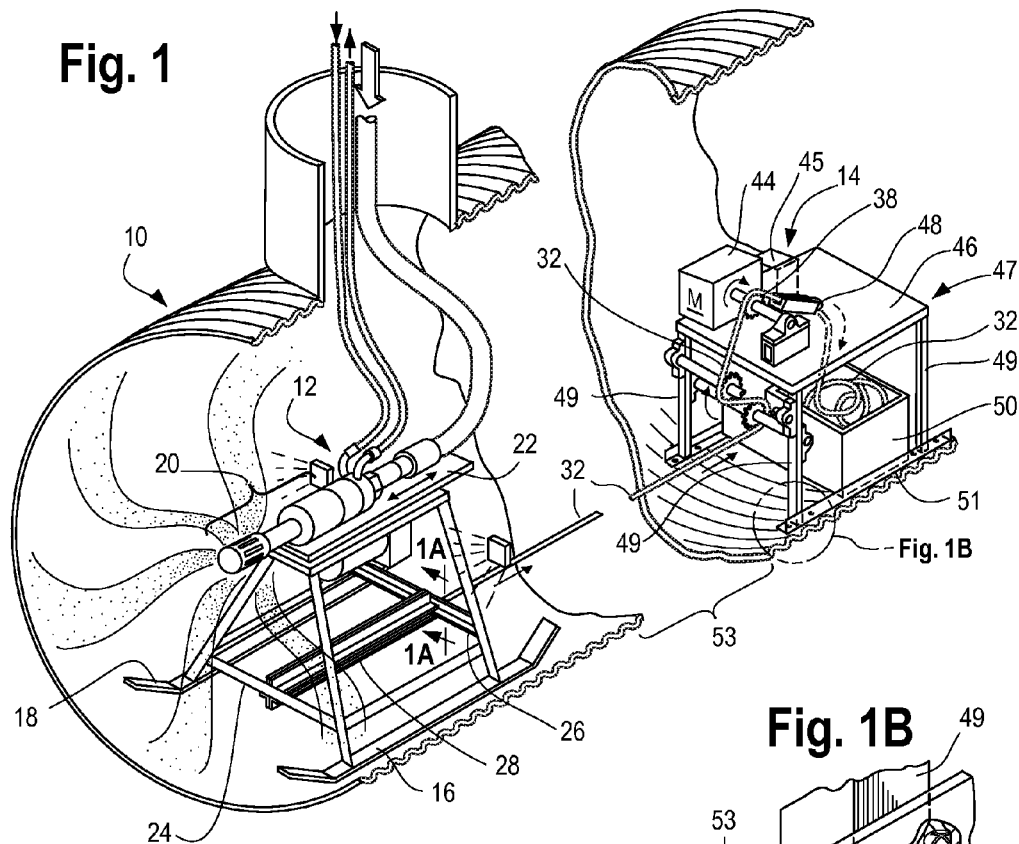
FIG. 1 is a perspective view of a sled assembly for application of a coating material and a planetary gear retrieval system of the present disclosure, the sled assembly including a spinner disposed on a linear oscillating plate, both the sled assembly and the planetary gear retrieval system disposed within a pipe, and a cover of the planetary gear retrieval system is removed for clarity.

Referring now to FIG. 1, a pipe 10, which may be corrugated, is illustrated. Within the pipe 10 are a sled 12 and a planetary gear retrieval system 14. The sled 12 may be made of a lightweight, durable alloy, such as titanium, includes a pair of skis 16, 18. A spinner 20 is mounted on the sled 12. As it is desirable to apply the coating material using a reciprocating motion, the spinner 20 (which may, for example, be an SPN1000 or SP1500, with slotted rotary head, available from Cangro Industries, Inc., RFI Construction Products Div., Farmingdale, N.Y.) is preferably mounted on a linear oscillating plate 22. The sled 12 includes cross braces 24, 26 which may be in the form of angle members. A central reinforcement member 28, which may be in the form of a plurality of angle members, may extend between the cross braces 24, 26. The sled 12 may optionally be provided with one or more rear-facing lights, such as LED lights 28, 30, mounted at or near a leading end of the sled 12, to provide illumination of the interior of the pipe 10, in real time, during application of coating material via the spinner 20.

Figure 1B:
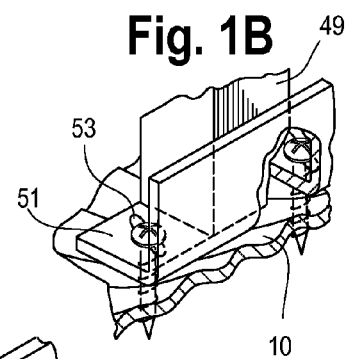
FIG. 1B is an enlarged, perspective view of a region of FIG. 1 designated as "FIG. 1B," illustrating a portion of a base of the planetary gear retrieval system bolted to a floor of the pipe.
Figure 1A:
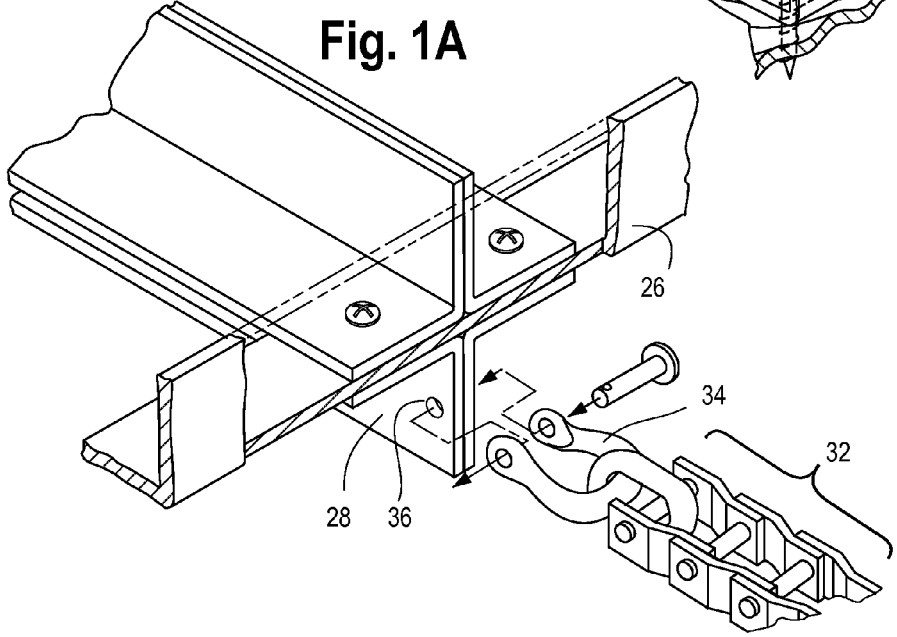
FIG. 1A is a cross-sectional view of a portion of a base of the sled assembly, taken along the lines 1A-1A of FIG. 1, illustrating a chain aperture and a chain link attachable to the chain aperture so as to secure a chain, which is driven by the planetary gear retrieval system, to the sled assembly.
Figure 2:
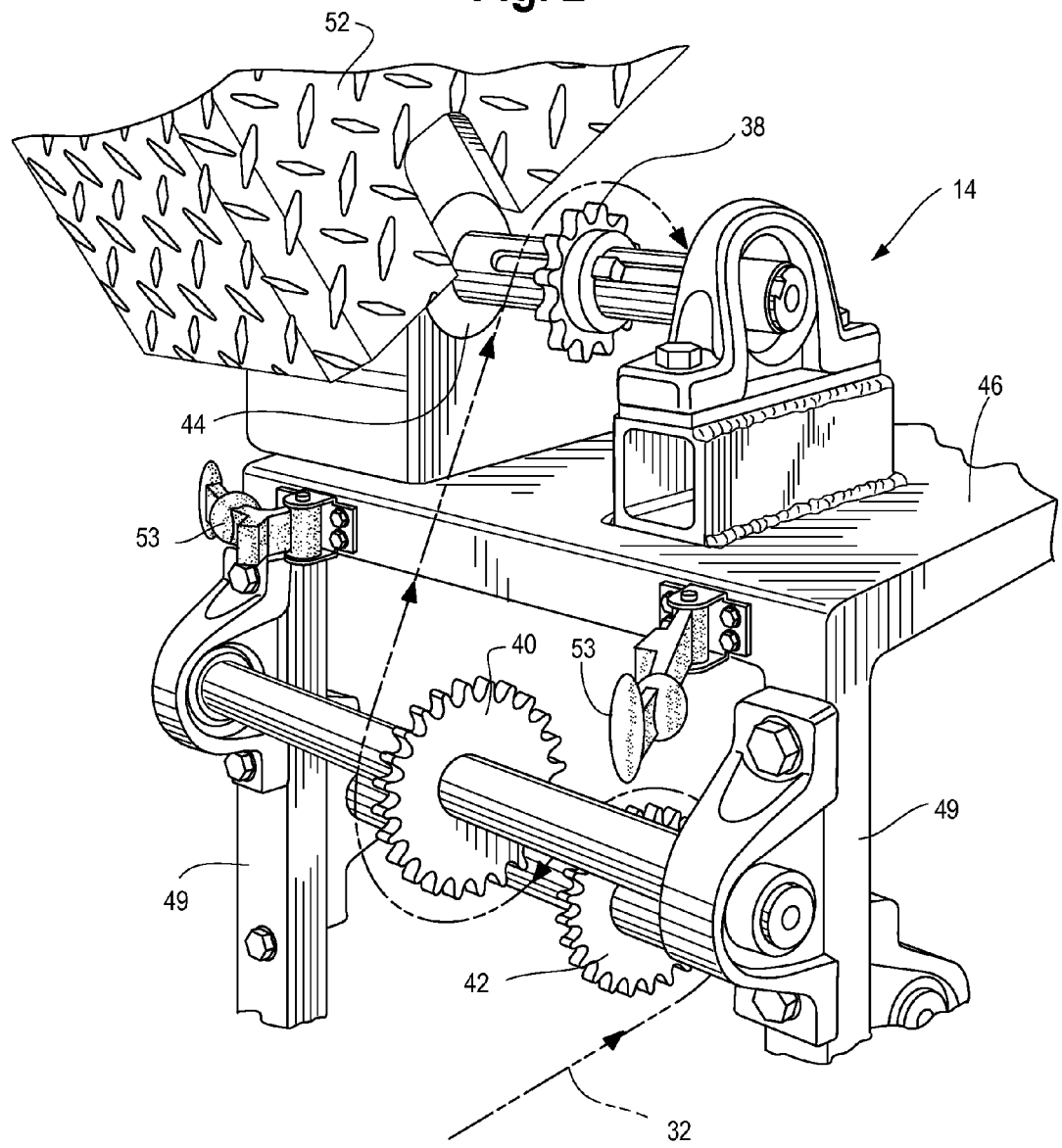
FIG. 2 is a front, perspective view of the planetary gear retrieval system of FIG. 1 with the cover for the planetary gear retrieval system illustrated in an open position, and illustrating a path within the planetary gear retrieval system through which the chain travels.

A chain 32 is secured by a chain link 34 through a chain aperture 36 provided in the central reinforcement member 28 near the leading end of the sled 12, such as by a cotter pin that extends through the both the chain link 34 and the chain aperture 36. The planetary gear retrieval system 14, as best illustrated in FIG. 2, has a network of gears including a first gear 38, a second gear 40, and third gear 42. The first gear 38 is preferably a driving gear, powered by a gear motor 44 that is controlled by a variable speed microcontroller 45 (such as a Fuji model FRN001C1S-2U microcontroller), while the second gear 40 and third gear 42 are preferably passive, or driven, gears. The chain 32 is threaded through the gears 38, 40, 42, such that rotation of the first gear 38 at a constant rotational speed imparts rotation of the second gear 40 and the third gear 42, and the chain 32 pulls the sled 12 in a direction toward the planetary gear retrieval system 14 at a constant rate. As illustrated in FIG. 1B, the planetary gear retrieval system 14 includes a stand 47 having legs 49 with cross-support braces 51 that may be bolted or otherwise fastened to a floor of the pipe 10 through fastener-receiving apertures 53 so as to avoid movement of the planetary gear retrieval system 14 during operation of the gear motor 44.

The planetary gear retrieval system 14 further includes a shelf or plate 46 on which the gear motor 44 may be mounted, the plate 46 being supported by the legs 49. The first gear 38 is disposed above the plate 46, so the plate is provided with an aperture 48 that permits the chain 32 to pass through the plate 46 and into a chain collection box 50 provided in a base of the planetary gear retrieval system 14.

To protect the planetary gear retrieval system 14 from coating material and other debris, a cover member 52 may be provided that can selectively be positioned over the network of gears. The cover member 52 is preferably hingedly mounted to the plate 46, and latches 53 may be provided to secure the cover member in a closed position.

Figure 3:
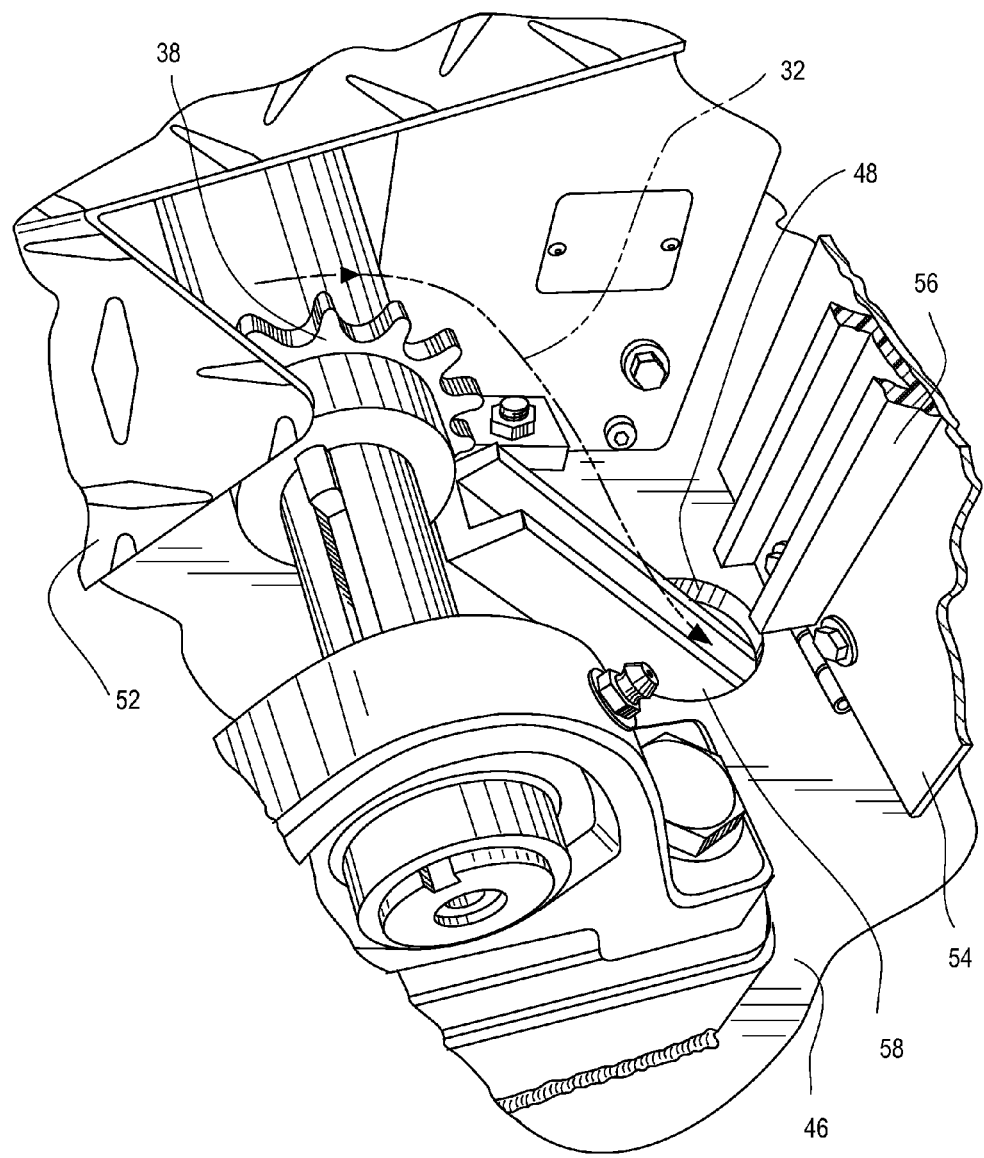
FIG. 3 is a top view perspective view of an upper portion of the planetary gear retrieval system of FIG. 1, illustrating a driving gear of the planetary gear system and a chute defining a path through which the chain passes through a support plate of the planetary gear retrieval system.
Figure 4:
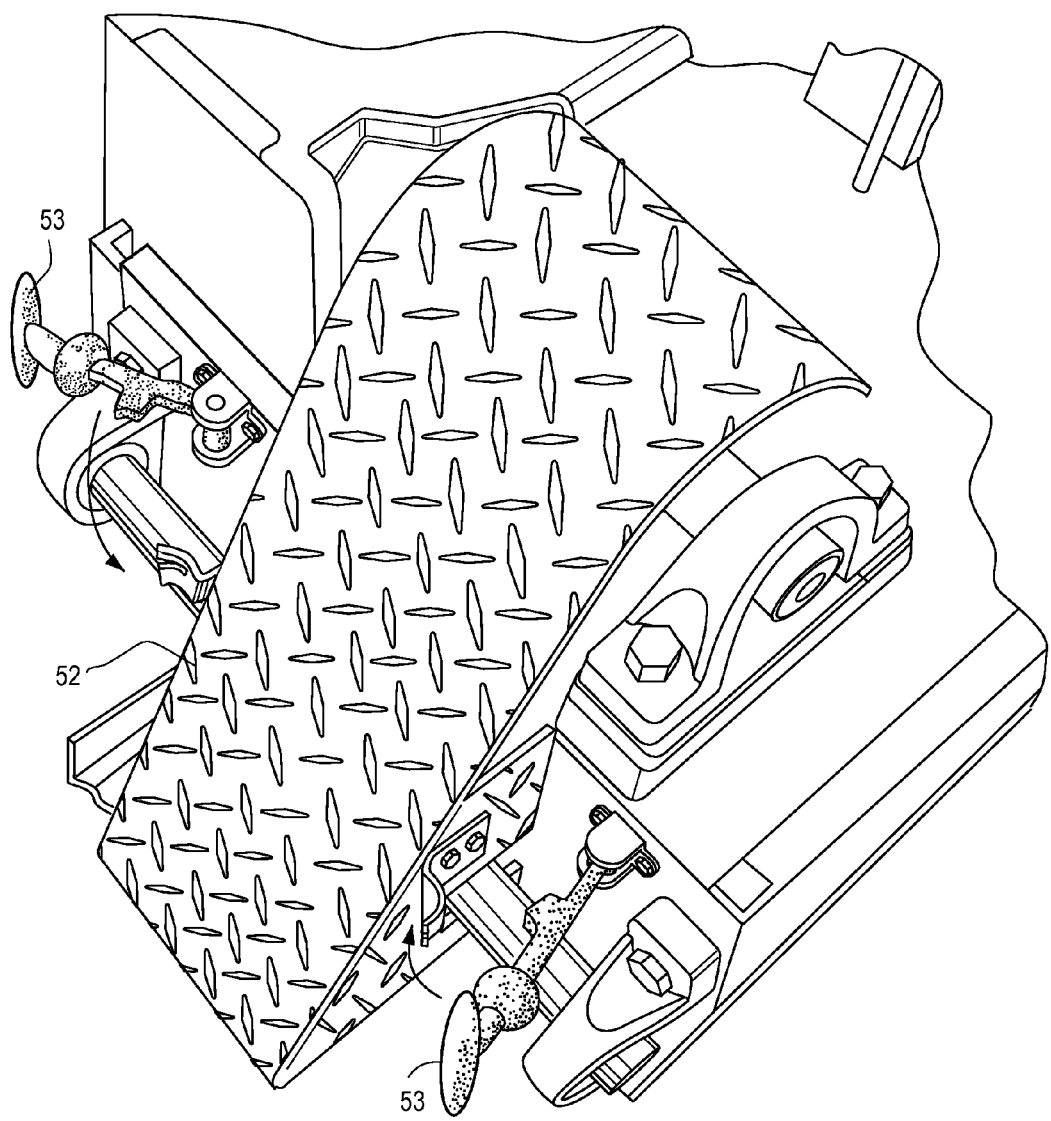
FIG. 4 is a top, perspective view of the planetary gear retrieval system of FIG. 1 with the cover to the planetary gear retrieval system in a closed position.
Figure 5:
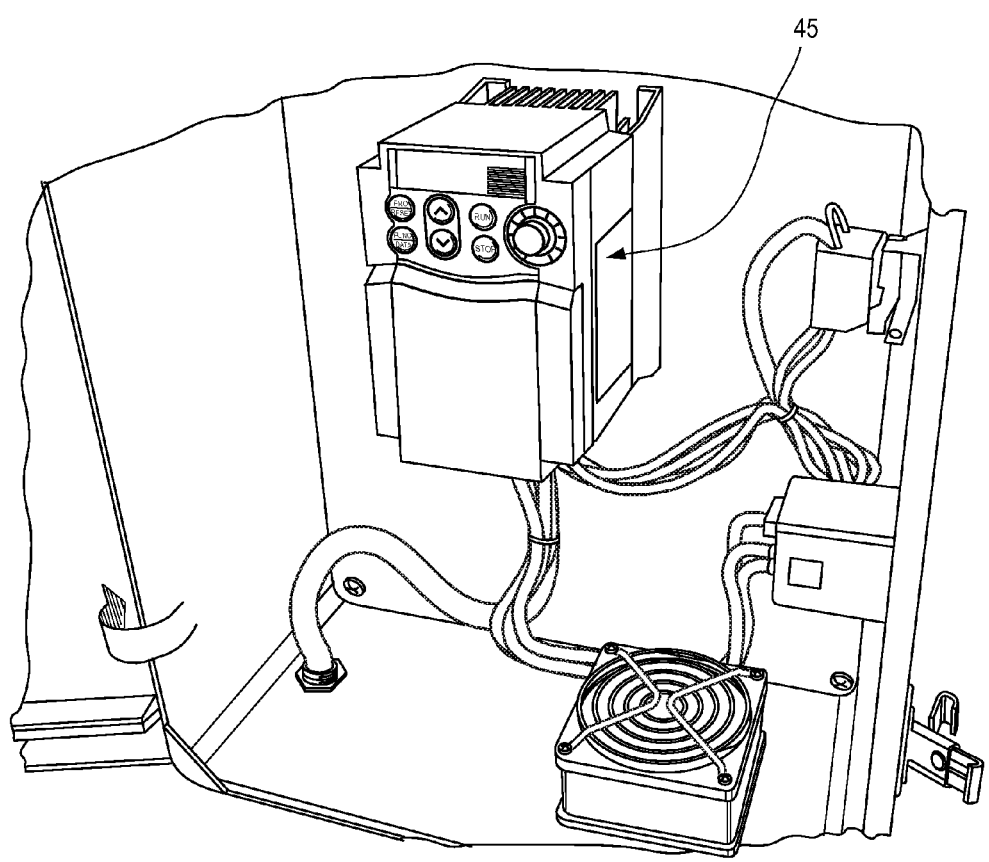
FIG. 5 is a perspective view of a microcontroller that is in operable communication with a gear motor of the planetary gear retrieval system of the present disclosure.

Turning now to FIG. 3, which illustrates the cover member 52 in an open position, it can be seen that on an underside of a rear panel 54 of the cover member, an inverted U-shaped channel 56 is provided in alignment with a similar upright U-shaped channel 58 that passes through the aperture 48. When the cover member 52 is closed (as illustrated in FIG. 4), the inverted U-shaped channel 56 cooperates with the upright U-shaped channel 58 to define an inclined chute to direct the chain 32 through the aperture 48 in the plate 46 so that the chain 32 can be fed into the chain collection box 50. The U-shaped channels 56, 58 are preferably made of a plastic material having a low coefficient of friction to facilitate smooth advancement of the chain 32 through the aperture 48 in the plate 46.

Figure 6:
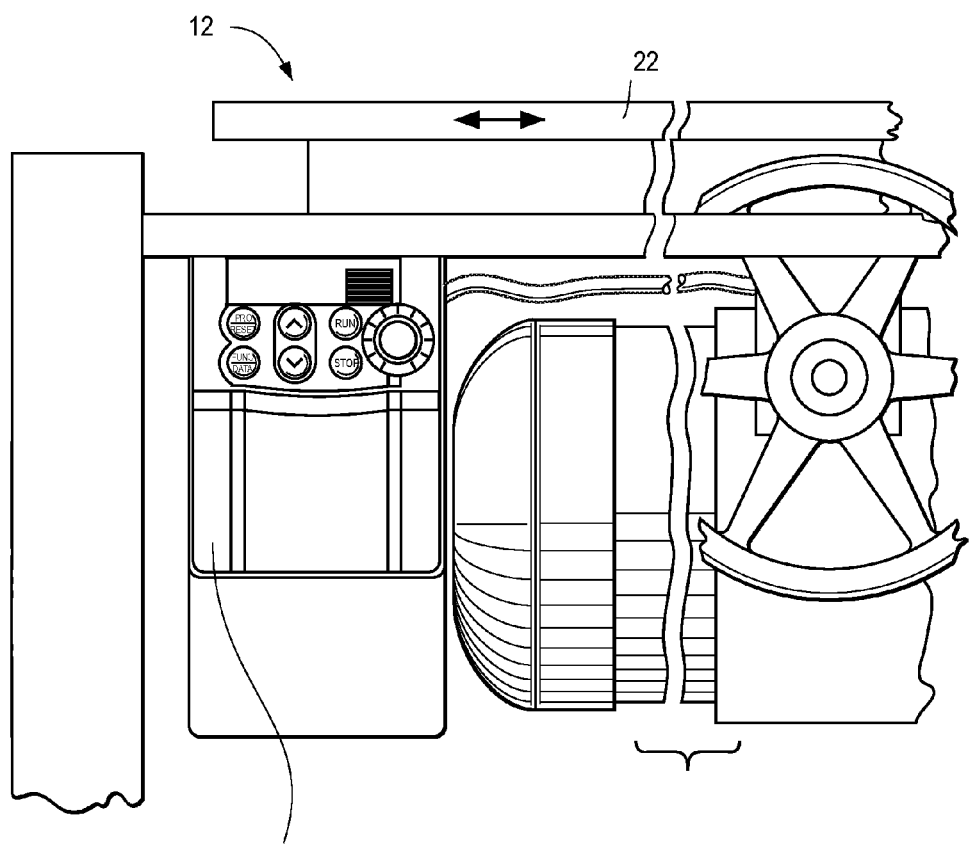
FIG. 6 is an enlarged, side plan view of the sled assembly with a microcontroller that is in operable communication with an oscillator motor that drives the linear oscillating plate of the sled assembly of FIG. 1.

Turning to FIG. 6, which illustrates a portion of the sled 12, a second variable speed microcontroller 60 is provided in operable communication with the linear oscillating plate 22. The linear oscillating plate 22 is controllable via the second variable speed microcontroller 60 (such as a Fuji model FRN002C1S-2U microcontroller) to move back and forth axially as the sled 12 is pulled by the chain 32 along the length of the pipe 10, achieving a desirable layering of the coating material as it is sprayed onto the interior of the pipe 10.

During operation, the variable speed microcontroller 45 signals the gear motor 44 to actuate the first gear 38 at a constant rotational speed, thereby driving the second and third gears 40, 42 (via the chain 32). The chain 32, which is attached to the central reinforcement member 28 of the sled 12, pulls the sled 12 toward the planetary gear retrieval system at a constant rate. The second variable speed microcontroller 60 signals a motor associated with a linkage of the linear oscillating plate 22 to actuate the linear oscillating plate 22 at a rate corresponding to the settings the operator programs into the second variable speed microcontroller 60.

For example, if the variable speed microcontroller 45 associated with the gear motor 44 of the planetary gear retrieval system 14 is set by an operator to pull the chain 32 (and thereby the sled 12) at a rate of two feet per minute, the second variable speed microcontroller 60 can be set to impart oscillations to the linear oscillating plate 22, such that the spinner 20 makes anywhere from one to twenty passes in a minute over the two foot area of the pipe along which the sled 12 traveled in that minute. By providing variable speed microcontrollers 45, 60 on the planetary gear retrieval system 14 (associated with the gear motor 44) and the sled 12 (controlling the rate of oscillation of the oscillating plate 22), respectively, an operator may set any different combination of speeds desired to achieve great precision and range with respect to the thickness of coating material to be applied along a given length of pipe. Through manipulation of the settings of the variable speed microcontrollers 45, 60 of the planetary gear retrieval system 14 and sled 12 in the manner described in the present disclosure, an operator can apply anywhere from ⅛" to 3" of coating material to a given length of the pipe 10.

While various embodiments have been described herein, it is understood that the appended claims are not intended to be limited thereto, and may include variations that are still within the literal or equivalent scope of the claims.

What is claimed is:

1. A system for applying a coating material to an interior of a pipe, comprising:
   a planetary gear retrieval system including a network of gears including a first gear, a second gear, and a third gear, the first gear being powered by a gear motor;
   a first variable speed microcontroller provided on the planetary gear retrieval system, the first variable speed microcontroller in operable communication with the gear motor;
   a sled including a pair of skis, a linear oscillating plate, and a spinner supported by the linear oscillating plate, the spinner configured to spray a coating material onto an interior of a pipe;
   a second variable speed microcontroller provided on the sled, the second variable speed microcontroller in operable communication with the linear oscillating plate; and
   a chain threaded through the first, second, and third gears, the chain having an end attached to the sled.

2. The system of claim 1, wherein the first variable speed microcontroller is operable to control the gear motor to drive the first gear of the planetary gear retrieval system to pull the chain, and thereby pull the sled, at a constant rate.

3. The system of claim 2, wherein the second variable speed microcontroller is operable to control the rate of oscillation of the linear oscillating plate in proportion to the rate the first variable speed microcontroller is set to pull the sled so as to achieve a desired number of passes by the spinner along a given length of travel of the sled.

4. The system of claim 1, wherein the chain is attached to the sled by securement of a chain link to a chain aperture provided in a central reinforcement member that extends between cross braces connecting the skis to one another.

5. The system of claim 1, wherein the sled includes at least one light directed toward a trailing end of the sled.

6. The system of claim 5, wherein each of the at least one lights is an LED light.

7. A method for applying a coating material to an interior of a pipe, comprising:
   providing a planetary gear retrieval system including a network of gears including a first gear, a second gear, and a third gear, the first gear being powered by a gear motor;
   fixing the planetary gear retrieval system to a floor of the pipe;
   providing a first variable speed microcontroller on the planetary gear retrieval system, the first variable speed microcontroller in operable communication with the gear motor;
   providing a sled spaced away from the planetary gear retrieval system, the sled including a pair of skis, a linear oscillating plate, and a spinner supported by the linear oscillating plate, the spinner spraying a coating material onto an interior of the pipe;
   providing a second variable speed microcontroller on the sled, the second variable speed microcontroller in operable communication with the linear oscillating plate; and
   threading a chain through the first, second, and third gears;
   attaching an end of the chain to the sled;
   programming the first variable speed microcontroller to control the gear motor to rotate the first gear at a constant angular velocity, thereby pulling the chain and the sled at a constant rate in a direction toward the planetary gear retrieval system;
   programming the second variable speed microcontroller to control the linear oscillating plate to oscillate at a rate that achieves a desired number of passes along a length of travel of the sled.

8. The method of claim 7, wherein in programming the second variable speed microcontroller, setting the second variable speed microcontroller to oscillate the linear oscillating plate at a rate that achieves, during each minute of operation, a number of passes in a range of one to twenty of the spinner along a length the interior of the large-diameter pipe along which the sled travels each minute based on the programming of the first variable speed microcontroller.

* * * * *